(12) United States Patent
Molinari

(10) Patent No.: US 7,269,176 B1
(45) Date of Patent: Sep. 11, 2007

(54) COMMUNICATIONS ARRANGEMENT

(75) Inventor: Mario Molinari, Genova Sestri Ponente (IT)

(73) Assignee: Marconi Communications S.p.A., Genoa (IT)

( * ) Notice: Subject to any disclaimer, the term of this patent is extended or adjusted under 35 U.S.C. 154(b) by 808 days.

(21) Appl. No.: 10/009,250

(22) PCT Filed: Jun. 8, 2000

(86) PCT No.: PCT/IB00/00841

§ 371 (c)(1),
(2), (4) Date: May 3, 2002

(87) PCT Pub. No.: WO00/76121

PCT Pub. Date: Dec. 14, 2000

(30) Foreign Application Priority Data

Jun. 8, 1999 (GB) .................................. 9913239.1

(51) Int. Cl.
*H04L 12/28* (2006.01)

(52) U.S. Cl. ....................................... 370/401

(58) Field of Classification Search ........ 370/401–405, 370/408, 428, 354, 380
See application file for complete search history.

(56) References Cited

U.S. PATENT DOCUMENTS

| 5,430,727 | A | * | 7/1995 | Callon ......................... 370/401 |
| 5,491,692 | A | | 2/1996 | Gunner et al. |
| 5,781,431 | A | * | 7/1998 | Duret et al. ................. 714/811 |
| 6,339,595 | B1 | * | 1/2002 | Rekhter et al. ............. 370/392 |
| 6,473,421 | B1 | * | 10/2002 | Tappan ....................... 370/351 |

(Continued)

FOREIGN PATENT DOCUMENTS

EP 0 895 380 A2 2/1999

(Continued)

OTHER PUBLICATIONS

International Standard, ISO/IEC 10589, First Edition Jun. 15, 1992, pp. 1-150.

(Continued)

*Primary Examiner*—Chi Pham
*Assistant Examiner*—Thai Hoang
(74) *Attorney, Agent, or Firm*—Kirschstein, et al.

(57) ABSTRACT

In a communications system, especially an SDH DCN system in which most network elements (NEs) function as intermediate systems (ISs) rather than end systems (ESs), it is made possible to reduce the constraints on the DCN topology posed by the IS-IS routing protocol by configuring the gateway element (GNE) and the NEs directly connected to it in such a way that the non-gateway NEs appear as ESs to the rest of the system. This is achieved by setting up on each of the digital communication channels (DCCs) of the GNE manual end-system adjacencies for all the NEs reachable through that DCC; setting the "external domain" attribute of these DCCs to TRUE and setting the same attributes of the corresponding DCCs of those NEs which are immediate neighbors of the GNE likewise TRUE; and supplying those DCCs with length-zero reachable address prefixes (RAPs) and configuring the neighbor NEs as level 2 Intermediate Systems. The invention applies especially to SDH ring topologies, in which case the gateway element has two DCCs, but also to bus topologies, in which case the gateway has only one DCC. Systems with more than one gateway element are also catered for.

26 Claims, 12 Drawing Sheets

U.S. PATENT DOCUMENTS

| | | | |
|---|---|---|---|
| 6,512,768 B1* | 1/2003 | Thomas | 370/389 |
| 6,587,475 B1* | 7/2003 | Przygienda | 370/465 |
| 6,724,757 B1* | 4/2004 | Zadikian et al. | 370/388 |

FOREIGN PATENT DOCUMENTS

| WO | WO98/26533 | 6/1998 |
|---|---|---|
| WO | WO99/23794 | 5/1999 |

OTHER PUBLICATIONS

International Telecommunication Union, ITU=T, G.784 (Jan. 1994), General Aspects of Digital Transmission Systems; Terminal Equipments; Synchronous Digital Hierarchy (SDH) Management, pp. 1-48.

Tmn Architecture for SDH Networks Using Is-is Routing Protocol: Design and Performances, Proceedings of International Conference on Communication Technology, vol. 1, May 5-7, 1996, pp. 223-227, L. Ambrosol, et al.

*SDH Management Network: Architecture, Routing and Addressing*, Proceedings of the Global Telecommunications Conference (GOLBECOM), U.S. New York, IEEE, vol, Nov. 29, 1993, pp. 223-228, H. Katz, et al.

*An Approach for Cluster-Basee Multicast Routing In Large-Scale Networks*, IEICE Transactions on Communications, JP, Institute of Electronics Information and Comm. Eng. Tokyo, vol. E81-B, No. 5, May 1, 1998, pp. 1029-1040.

\* cited by examiner

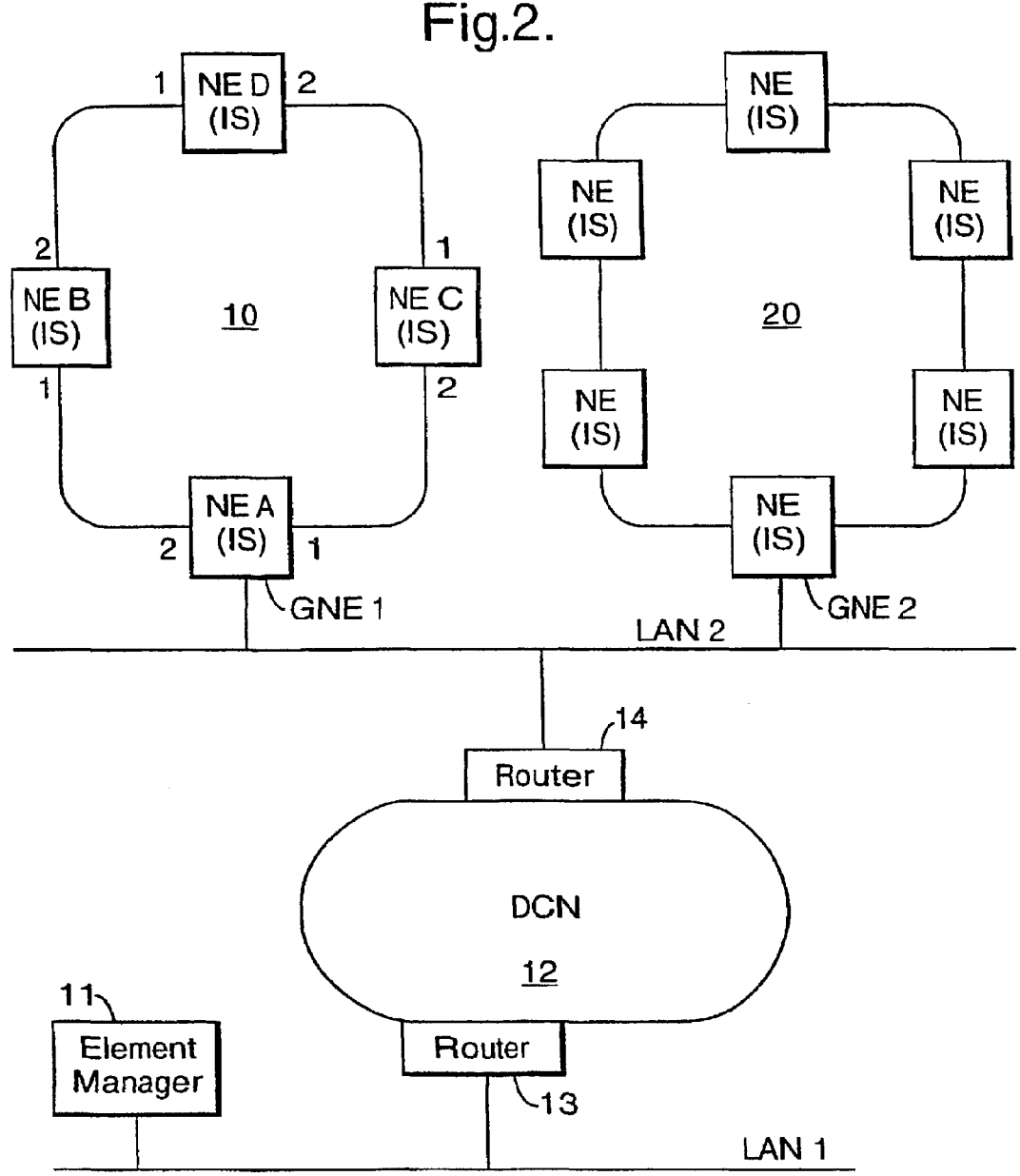

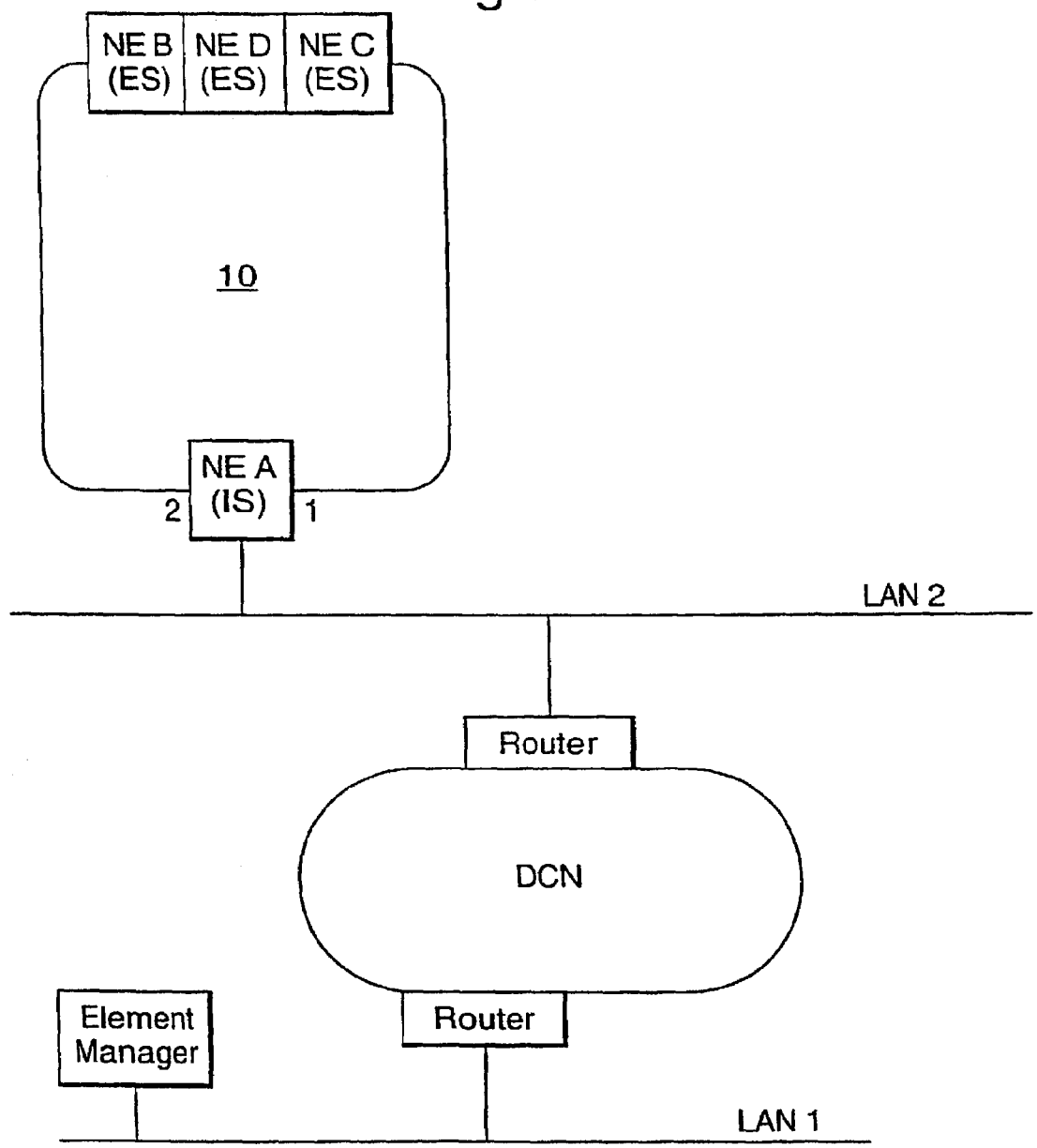

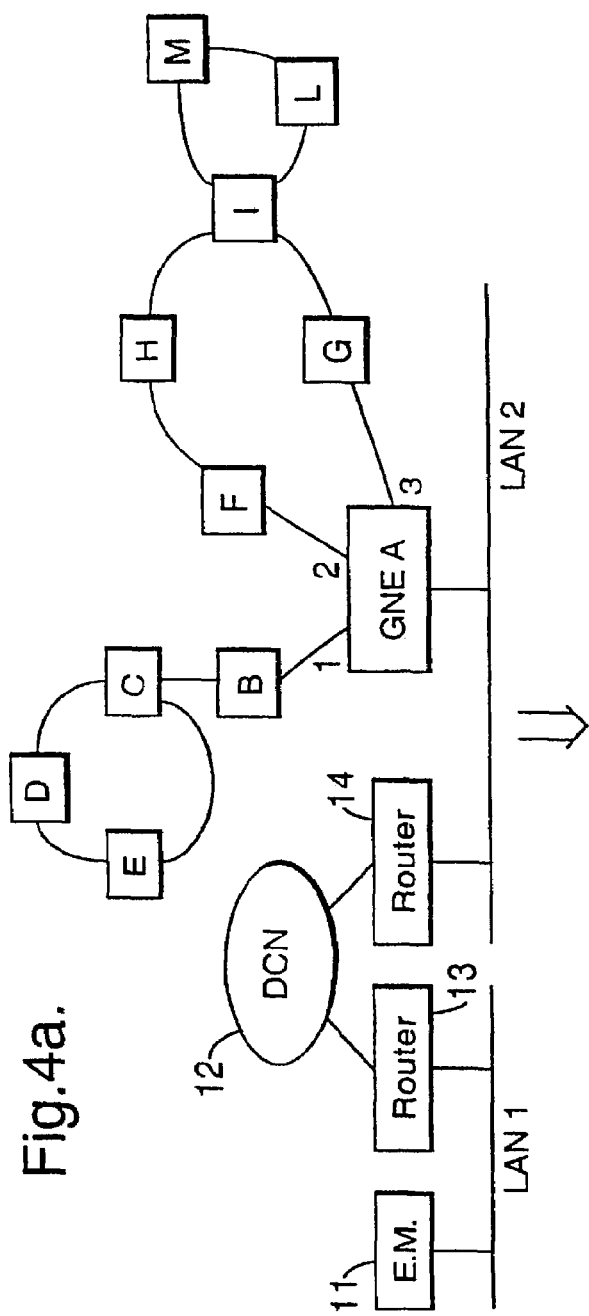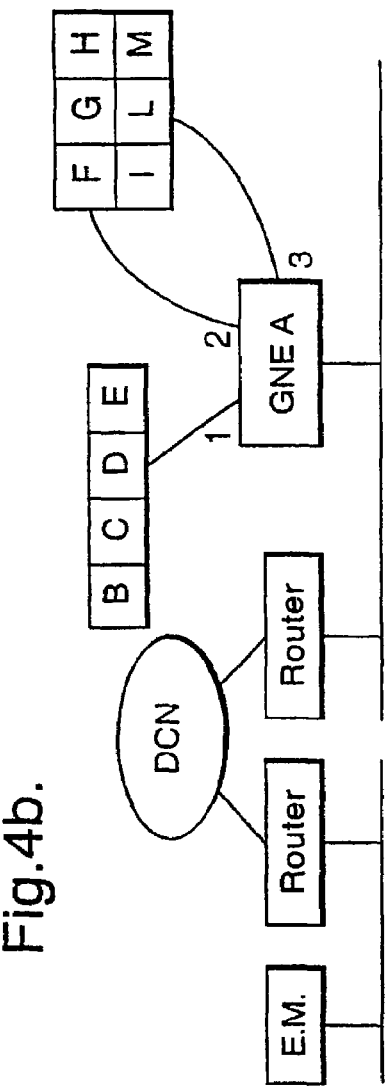
Fig.4a.
Fig.4b.

COMMUNICATIONS ARRANGEMENT

BACKGROUND OF THE INVENTION

The invention relates to a communications arrangement forming part of a communications system, in particular, but not exclusively, an SDH-DCN communications system.

A typical OSI (Open Systems Interconnection) routeing scheme involving the so-called "IS-IS Routeing Protocol" is illustrated in FIG. 1. In FIG. 1 a wide-area network (WAN) is shown divided into two domains, each domain being split into two areas. Each area contains a number of systems, which are designated either as end-systems (ESs) or intermediate systems (ISs). The ESs, which may represent hosts or various devices (e.g. servers), may be linked to one or more ISs via either point-to-point or broadcast circuits in a LAN (Local Area Network) or, for a geographically larger area, a MAN (Metropolitan Area Network) or WAN (Wide Area Network).

Routeing of message packets from any ES in one area to another ES in the same or another area is conventionally carried out under separate routeing protocols which correspond to a particular routeing hierarchy. Routeing between ESs and ISs is by way of the ES-IS protocol; that between any two ISs within the same area is via the intra-domain IS-IS protocol (Level 1), and that between two ISs in different areas is via the intra-domain IS-IS protocol (Level 2). Routeing between two different domains is outside the scope of the IS-IS protocol. However, the protocol provides a way to disseminate the inter-domain routeing information to all the inter-area routers, or level 2 Intermediate Systems, as they are called.

Details of the IS-IS intra-domain routeing protocol between intermediate systems are given in ISO/IEC Recommendation 10589, first revision (1992 Jun. 15) "Information technology—Telecommunications and information exchange between systems —Intermediate system to Intermediate system intra-domain routeing information exchange protocol for use in conjunction with the protocol for providing the connectionless-mode Network Service (ISO 8473)". ITU-T Recommendation G.784 June 1999) "General Aspects Of Digital Transmission Systems; Terminal Equipments" addresses management aspects of the SDH, including the control and monitoring functions relevant to SDH network elements.

Two types of routeing have traditionally been employed: static routeing and dynamic routeing. With static routeing, some Intermediate Systems in a domain store routeing criteria of various types. Such criteria are manually entered by the operator and are used to match the destination address of a packet against the criteria, to ascertain whether the packet may be routed on the circuit to which the static route is associated. With dynamic routeing, each system keeps a table containing the state of all routes within its scope. The table is updated on a continual basis. Since dynamic routeing is adaptive, being able to take account of broken links between systems or to take account of systems themselves being out-of-service, and is also decentralized, it has clear advantages over static routeing and is therefore the dominant form of routeing currently employed, at least under the intra-domain IS-IS protocol.

The ISs are divided into two main types: level 1 (L1), which routes packets within a particular area, and level 2 (L2), which routes packets between areas and between domains. Usually, an L2 IS also has an L1 routeing function, and is therefore actually an L1/L2 IS.

For dynamic routeing to occur, the following conditions must be satisfied.

Each IS must be apprised of the state of its neighbour ESs. In the same way, each ES must be apprised of the state of its neighbour ISs.

Each L1 IS must be apprised of the topology of the area of which it is part.

Each L2 IS must be apprised of the topology of the level 2 sub-domain of which it is part (that is, the partition of the domain made up of L2 ISs and of the links between them).

In order to accomplish this, all the End and Intermediate Systems in the domain exchange "hello" packets, to know who are their neighbours. ISs also generate and flood LSPs (the LSP, or Link State Protocol data unit, is a packet containing the list of the neighbours of the originating IS), so that they become aware of the topology of the partition of the network within their scope (where the scope is the area, for level 1 ISs, and the level 2 sub-domain, for level 2 ISs). In this way, ISs are enabled to make the appropriate routeing decisions both at the L1 and at the L2 routeing level.

The dynamic link-state updating process just described does not occur on the inter-domain level, however, but instead a static routeing method has to be employed in order to route packets from one domain to another. In order to achieve this, the routeing tables of the L2 ISs are provided with "reachable address prefixes" (RAPs), which are generated either manually, or by means of a dynamic inter-domain routeing protocol. Such RAPs provide routeing criteria for the packets that may not be routed on the basis of the dynamic routeing information available (as they are addressed outside the domain). The criterion is that if the destination address of the packet begins with a pattern matching an existing prefix, it may be forwarded on the circuit associated with such a prefix (which circuit will turn out to be a domain boundary).

In an actual routeing exercise, an L1 IS will receive a packet from one of its associated ESs (note that if a system acts both as an End and as an Intermediate System, this is represented by the IS having itself as an ES neighbour). If the packet is destined for an ES in the same area, it will be routed by that L1 IS either to the destination ES directly, or via one or more other L1 ISs. If the packet is destined for an ES outside the source area, the L1 IS will pass the packet on to the nearest L2 (or L1/L2) IS in the source area (possibly passing through one or more other ISs). Once the packet gets to the L2 sub-domain, it will be passed on to an appropriate L2 (or L1/L2) IS in the destination area. Finally, the packet is delivered by L1 routeing to the destination ES, either directly, or via one or more other L1 ISs.

In one particular type of telecommunications system, namely the SDH (Synchronous Digital Hierarchy) system, a ring arrangement of systems (called "network elements" in SDH terminology) is often employed. This is illustrated in FIG. 2, in which an Ethernet LAN 2 is connected to a ring 10 of network elements (NEs) A, B, C and D (only four are shown for the sake of simplicity), one of which—NE A—is designated as the "gateway NE" (GNE). The GNE (also known as the "head of the ring") is the NE which provides access to the other NEs in the ring for the Element Manager (EM). The EM is a system (normally running on a computer) which performs administrative operation on SDH NEs, such as configuration, alarm and performance data management. The DCN (Digital Communications Network) is the network that provides the support for the dialogue between the EM and the NEs. In practice, there may be tens of NEs on a ring, and many tens of rings connected to a single GNE. As most of these NEs need to be functioning as ISs (because they have to route packets towards the further NEs), usually all the NEs are configured to act as ISs. Also, in practice there may be a number of GNEs present on LAN 2 (FIG. 2 shows a second ring 20 with its own GNE, GNE 2), and some of the NEs in a ring may in turn have their own sub-rings.

Each NE in each ring is equipped with a couple of data communication channels (DCCs) through which it communicates with the next and the previous NE in the ring. These DCCs are shown in FIG. 2 as channels "1" and "2" associated with NEs A, B, C and D.

The element manager 11, which is connected to another LAN, LAN 1, communicates with the rings 10 and 20 via the Data Communications Network (DCN) 12, via a router 13 upstream of the DCN, and via a router 14 downstream of the DCN and connected to the LAN 2. The routers are effectively ISs.

In the normal configuration, in which IS-IS dynamic routing (described earlier) is employed, router 14, all the GNEs on LAN 2 and all the NEs reachable through these GNEs (including NEs B, C and D) are located in the same IS-IS area. Since there may result a large number of ISs in that area, problems in routeing may be caused due to the restrictions in the number of ISs which the IS-IS protocol, by its design, can handle. In practice, the protocol suggests that a typical maximum configuration domain will contain at most 400 L2 ISs and at most 100 L1 ISs per area, while the domain is allowed to comprise up to 4000 systems.

The above-mentioned restrictions are due to the fact that each of the NEs in the area has, in the conventional arrangement, a complete view of the topology of the area (as explained earlier). Thus, an NE reachable through a GNE on one ring (e.g. GNE 1) has to process all the ISPs generated by any other NE on any ring in the same area (e.g. one of the NEs in ring 20), and this can lead to various problems, such as memory exhaustion, CPU overload and traffic bursts due to the routeing messages (such bursts may be particularly critical when there is a sudden change in the network topology).

SUMMARY OF THE INVENTION

The present invention aims to obviate this restriction while still employing the standard IS-IS protocol. It does this by recognising that it is not important for the rest of the network to know exactly the topology of each ring. It is only important that the DCN knows on which DCCs an NE may be reached. It is also desirable, in a real system, that a failure on one of the links of a ring (e.g. the link between NE B and NE D in ring 10) should not make an NE impossible to reach, as long as the other route to that NE is still operative.

In accordance with the invention, there is provided a communications arrangement forming part of an SDH-DCN communications system, the arrangement comprising a network (LAN 1), a gateway network element (NE A) connected to the network and one or more further network elements (NE B, C, D) which, together with the gateway element, form at least a part of a routeing area, the gateway element acting as an interface between the further elements and the network, wherein the further elements are intermediate systems, but the gateway element and the further elements are configured such as to make the further elements appear as end systems as far as the rest of the communications system is concerned.

Preferred features and various realisations of the invention are contained in the subclaims.

DESCRIPTION OF THE DRAWINGS

Realisations of the invention will now be described with the aid of the drawings, of which:

FIG. 2 shows an SDH-DCN ring arrangement;

FIG. 3 shows how the ring 10 of FIG. 2 appears to the rest of the DCN, after the GNE of that ring has been reconfigured to enable the alternative IS-IS routeing defined by a first embodiment of the invention to be employed.

FIGS. 4 to 6 illustrate alternative embodiment of the invention in the case where a single GNE is involved.

DETAILED DESCRIPTION OF THE PREFERRED EMBODIMENTS

Figure 1:
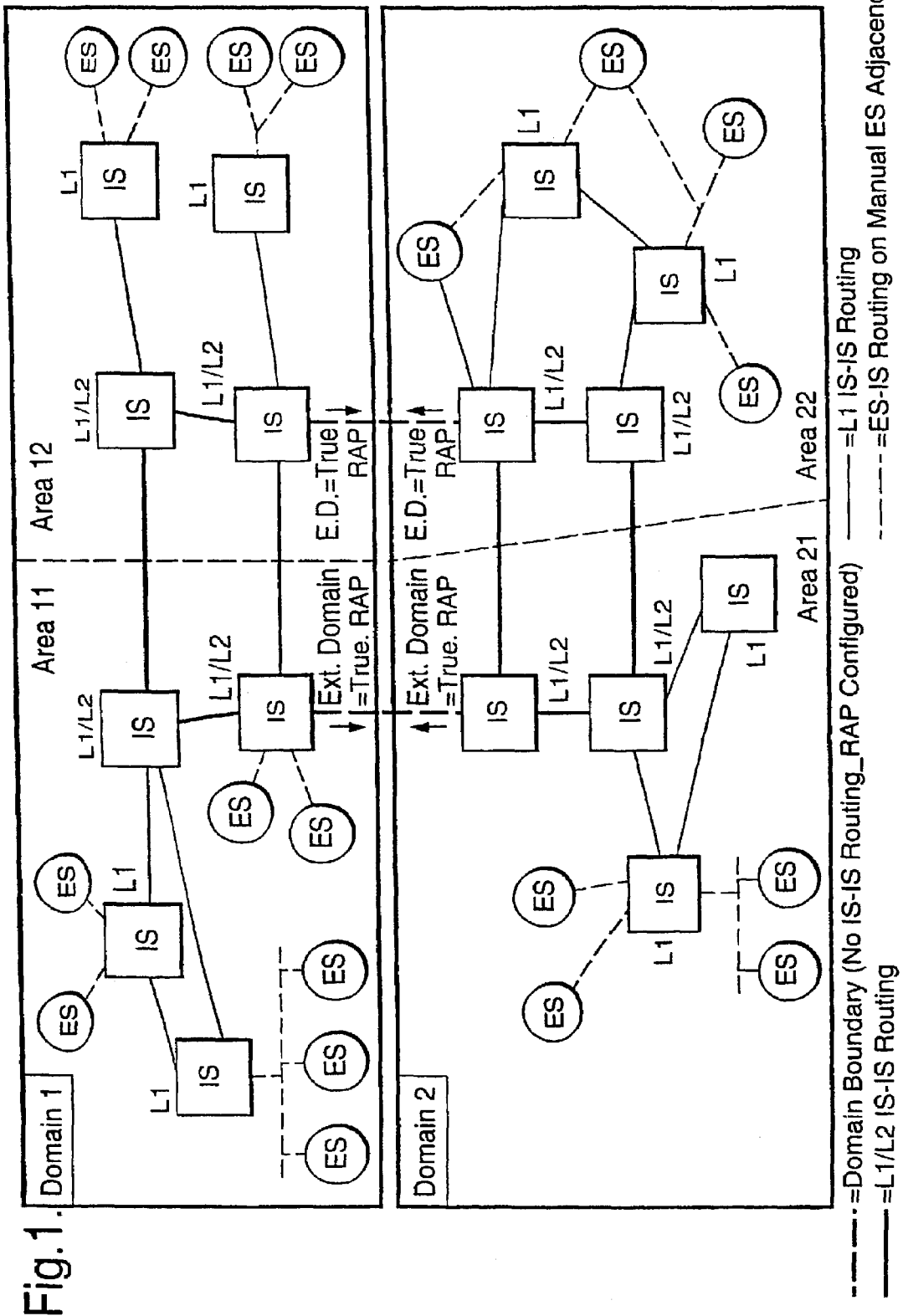
FIG. 1 is a diagram illustrating the IS-IS routing hierarchy in a typical communications configuration.

A first realisation of the invention is now described, in which the gateway NE for ring 10, i.e. NE A, is reconfigured such as to make the ring appear as a number of ESs connected to the GNE, as far as the rest of the DCN is concerned. To effect the re-configuration, NE A has its "external domain" flag manually set to TRUE for both the point-to-point circuits associated with DCC 1 and DCC 2. This setting of the flag, (which is provided by the protocol normally to set a domain boundary) in this case allows the prevention of IS-IS routeing towards the rest of ring 10. In addition, manual end-system adjacencies for NE B, C and D are entered by the operator both on DCC 1 and on DCC 2 of NE A, so that the rest of the network "sees" NEs B, C and D as ESs, reachable through DCC 1 or 2. A manual ES adjacency is a static route which may be entered manually on an IS to declare that one or more ESs in its same area are neighbours of the IS on a given circuit. The result is that the topology illustrated in FIG. 3, in which NEs B, C and D appear as ESs directly connected to DCCs 1 and 2 of GNE A, is made known to the rest of the system by LSPs generated by the GNE.

Since NE A has its "external domain" flag is now set on DCC 1 and 2, no IS-IS LSPs are forwarded onto the ring. The result is that, in this arrangement, there is no overhead due to the processing by the GNE of LSPs generated on the ring 10 (or on any other ring for which, in practice, it might act as a gateway) and no overhead due to the processing, on the NEs of one ring (e.g. ring 10), of LSPs generated on another ring (e.g. ring 20). There are also no LSP bursts (the previously mentioned "flooding") involving the ring 10.

Although NE A has been suitably reconfigured to make ring 10 effectively a separate domain, this is not in itself sufficient to create a working system, since the other NEs on the ring, NEs B, C and D, are still set up as normal ISs which rely on the receipt of dynamic routeing information from the rest of the network, and there is now no exchange of such dynamic routeing information involving this ring. In order to make it possible for NE B, for example, to send packets out of the ring 10, it is (manually) configured as a level 2 (L2) IS having its "external domain" attribute flag set to TRUE on its own DCC 1 circuit. In addition to this, it is provided with a length-zero RAP (reachable address prefix) on that same DCC. A length-zero prefix is a RAP that matches any destination address. Thus a packet with any destination address which is to be sent out of the ring from NE B will automatically be routed through to the gateway, NE A, and out to the rest of the network.

A similar process is applied to NE C, i.e. it has its "external domain" attribute set to TRUE and it is also provided with a length-zero prefix, but both this time on circuit DCC 2, since this is the circuit which is immediately connected to NE A.

As far as NE D (and any other NE possibly present on the ring) is concerned, this does not require to be manually reconfigured at all, but can be maintained as a normally configured L1 IS with no manual routeing information (i.e. no RAPs and no manual adjacencies). In practice, NE D will route all its outgoing traffic towards either NE B or NE C, as these NEs each have an outward route by virtue of their RAP setting. NE B or C, in turn, forward the packets they receive towards NE A. Once on NE A, all the packets are delivered to their destination via normal IS-IS dynamic routing, since NE A has a dynamically derived knowledge of the DCN topology before it.

Concerning incoming traffic entering the ring, NE A delivers any packet addressed to one of the NEs for which it has manual adjacencies configured, either on DCC 1 or on DCC 2. The rest of the network becomes aware of these adjacencies because they are reported in the level 1 (intra-area, i.e. L1) LSPs communicated from NEs B and C to the gateway and passed on from there to the rest of the system. Hence the rest of the network knows to send packets having a ring-10 address to gateway NE A.

It should be noted, as an explanatory point, that, although the NEs in the ring appear to the rest of the DCN as ESs, inside the ring they still appear to each other as a ring-configured series of ISs within a separate "domain". Hence normal dynamic routing takes place within the ring, but not between the ring and the rest of the system.

What has so far been described is a basic realisation of the invention. In reality, however, this novel approach presents a number of drawbacks. These are:

(1) It is necessary to set up two manual end-system adjacencies on NE A for each NE on the ring. Since there may be many elements on the ring, this represents an undesirable overhead in terms of human technical intervention.

(2) As manual adjacencies are static, there is no dynamic recovery against the failure of a link on the ring. Indeed, it is the strength of dynamic routeing that such failure can be circumvented. There may, however, be some recovery for those links adjacent to the gateway. For such circuits, it is possible to monitor the Data Link connection, assuming that AITS (Acknowledged Information Transfer Service) is the transfer service mode allowed on the Data Link Layer. In this case, the Data Link layer turns out to be connection-oriented. Under these circumstances a loss of connection will be promptly signalled to the Network Layer and therefore to the gateway. (The Data Link Layer and the Network Layer are Layers 2 and 3 of the OSI system).

(3) Under normal intra-domain IS-IS routeing, a packet originated within one part of an area and bearing an address within another part of the same area should be routed to the destination area (by L1 IS routeing). In the present case, however, a message generated within ring 10 and addressed to an NE outside the ring, but within the same area (e.g. within the ring 20 in FIG. 3), may be discarded by the originating NE. This is because ring 10 acts as a separate domain outside the scope of L1 routeing.

A solution to these drawbacks is now addressed.

Manual End-System Adjacency Overhead

The proposed solution here is to allow a user to enter onto the gateway NE a static route record defining a manual adjacency covering one or more ranges of consecutive System Identifiers. Thus, if it is possible to define a static route record allowing for up to, say, three ranges of up to, say, 255 System Identifiers, the user could enter with only a single data entry static routes for up to 765 NEs which may be reached via a given DCC. This solution implies that the Network Addressing Plan is designed in such a way as to have consecutive System Identifiers for the NEs belonging to the same ring. (There may, however, be some gaps in the series). In practice this is not a real limitation on the Network Addressing Plan, since this "consecutiveness" constraint is already normally satisfied anyway.

Static Routeing Recovery Mechanism

Under normal routeing practice, whether GNE A sends an incoming packet to, say, NE D on its DCC 1 circuit or its DCC 2 circuit will depend on the comparative metrics of the two routes. The metric is a measure of the cost of establishing a route over a particular circuit according to a particular criterion chosen. Possible criteria are: the circuits capacity to handle traffic (this is the normal "default" metric used), the transit delay of the circuit, the monetary cost of utilising the circuit, or the residual error probability of the circuit. Whichever metric is used, the cheapest circuit is chosen. In the proposed, static, configuration, the choice made by GNE A between DCC 1 and 2 is a random one, as the two DCCs each happen to have a Manual Adjacency to the destination with the same metric cost. Under normal dynamic routeing, if one of two possible circuits were "down" (not functioning), this would be dynamically communicated to the NE concerned so that it would then choose the other, regardless of whether it was the "best" (metrically speaking) route. Under static routeing this is not possible, with the result that the NE will try to send a packet along the "best" route anyway, even if it is "down".

Now, if the link between A and B, or between A and C, fails, the GNE is notified of this failure by the Data Link layer (supposing that the layer two protocol is connection oriented, which is necessary for recovery to work). In this case, the manual adjacency on the failed circuit becomes non-operational, so that the other circuit is automatically selected. But if the circuit between B and D or between C and D fails, the GNE has no way of knowing this (as there is no longer any dynamic knowledge of the ring topology). In this case, if, for example, the link between B and D fails, and A sends to B a packet addressed to D, B sends the packet back to A. In fact, the only possible route for the packet, on B, is the length-zero prefix towards A. If A chooses to go on sending the packet to B, it enters a routeing loop until its lifetime expires and it is discarded.

The solution proposed here is the following upgrade to the implementation of the forwarding process on the NE. Suppose that the following conditions apply:

1. The NE has to forward a packet using a manual adjacency.

2. There are two manual adjacencies, say ADJ-1 and ADJ-2, which match the destination address of the packet.

3. ADJ-1 and ADJ-2 have the same metric cost.

4. The packet was received on the circuit associated with ADJ-1 (ADJ-2).

In this situation, the NE forwards the packet on ADJ-2 (ADJ-1), so that, if it is sent onto the "wrong" DCC, the first time (in the above example, towards B), when it comes back it is sent onto the right one (in this case, towards C).

Intra-Area Routeing Protection

If a packet bears an address in the area in which it was originated, but outside the ring, it is arranged for the packet not to be discarded by level 1 routeing if an "attached" Level 2 router (that is, an L2 IS which declares itself to have access to other areas—in this case, one of the NEs connected to the GNE) can be reached by the L1 IS handling the packet.

This improvement applies to the small DCN, where the EM and all the NEs fit in the same area, and to all DCNs in which it is necessary to route packets from one ring to another.

Although the invention has been explained largely with reference to a simple ring configuration, as illustrated in FIG. 1, the invention is not limited to only such configurations. Indeed, it is not restricted to ring topologies at all.

FIGS. 4 to 9 depict other realisations of the invention in an SDH-DCN setting. In FIG. 4a, an arrangement using exclusively IS-IS dynamic routeing is shown in which, as before, an Element Manager 11 is connected to an Ethernet LAN (LAN 1) and thence via routers 13, 14 and a DCN 12 to a second LAN (LAN 2). In this case, however, a gateway NE, GNE A, has connected to its DCC 1 a network comprising ISs B, C, D and E—elements C, D and E forming a conventional ring—and has also connected to its DCCs 2 and 3 a ring comprising ISs F, G, H and I, element I itself having connected to it a ring consisting of ISs L and M.

The present invention takes the given IS configuration and splits off the ISs on DCC 1 as one group of ESs reachable on this DCC and the ISs on DCCs 2 and 3 as another group of ESs. A manual ES adjacency to systems B, C, D and E is entered by the operator on the circuit associated with DCC 1, for which the "external domain" attribute is also set. Two more manual ES adjacencies to systems F, G, H, I, L and M are entered, on the circuits associated with DCCs 2 and 3. In addition, elements B, F and G are designated as L2 ISs, and are provided with length-zero RAPs on their circuits connecting to the GNE, for which circuits the "external domain" attribute is set TRUE as well. The topology displayed by the GNE to the rest of the DCN, by means of its own LSPs, is shown in FIG. 4b.

In this case, it should be noted that, as far as the part of DCN reached on DCC 1 is concerned, there is only one boundary, since only one DCC is involved. This means that there is no "redundancy" and therefore a break in any link cannot be obviated, unlike the case where there is a failure of a link or system reachable through DCC 213.

Figure 5B:
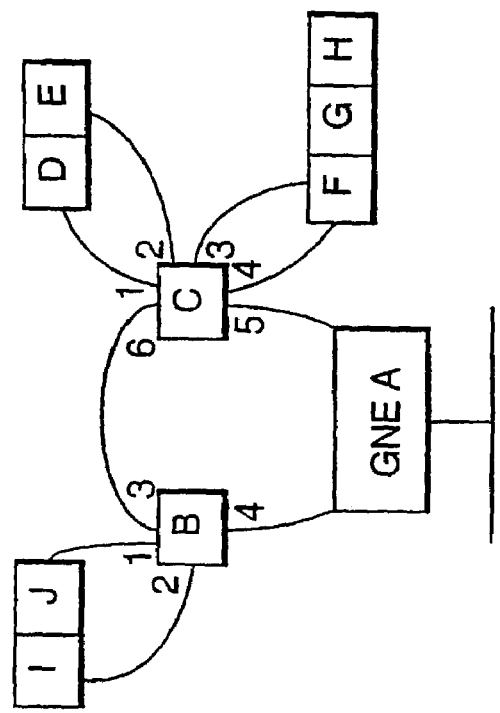
Figure 5A:
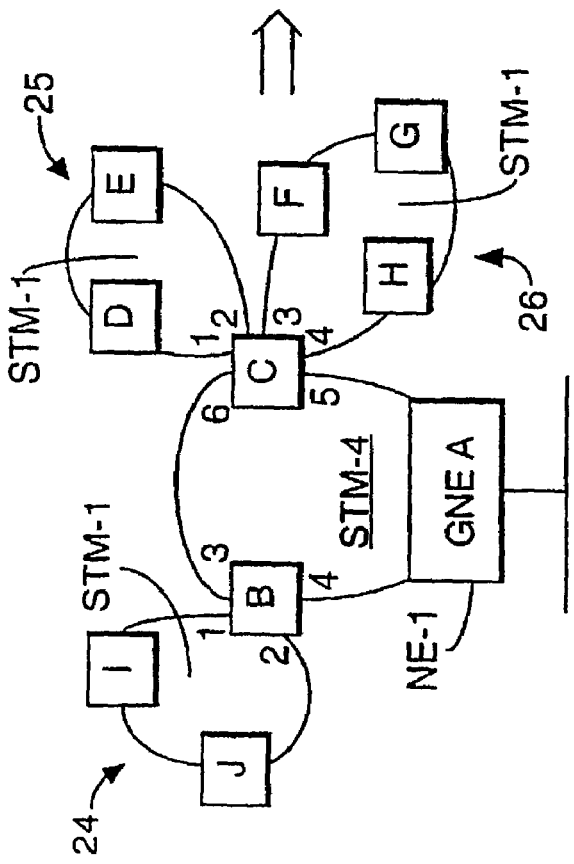

FIG. 5a shows a configuration in which GNEs are reached by the DCN not via Ethernet, but by means of DCC directly. In the setup shown, an ADM-4 arrangement comprises NEs B and C, which act as non-gateway NEs for an STM-4 ring and at the same as GNEs for a number of STM-1 sub-rings 24, 25 and 26. It is assumed that dynamic routeing is to be maintained for the STM-4 ring, but not for the others. The invention is here brought into play to arrive at FIG. 5b. In FIG. 5b each of the STM-1 sub-rings 24, 25 and 26 is converted as previously described by making elements B and C "local" GNEs for their respective rings. The "external domain" attribute is set TRUE for DCCs 1 and 2 on B, (and DCCs 3 and 4 on C) and ES adjacencies are entered by the operator on B and C for the non-gateway NEs. These adjacencies are towards NEs I and J in ring 24, D and E in ring 25 and F, G and H in ring 26. As before, all these same elements (except element G) have length-zero prefixes set up on the circuits connecting them to their respective GNEs, for which the "external domain" flag is also set TRUE, and are all configured as L2 ISs, except G. NE G is not reconfigured, but is maintained as an L1 NE.

Figure 6A:
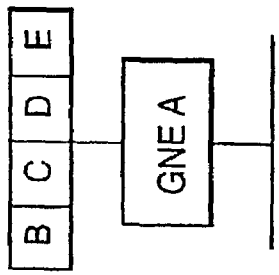
Figure 6B:
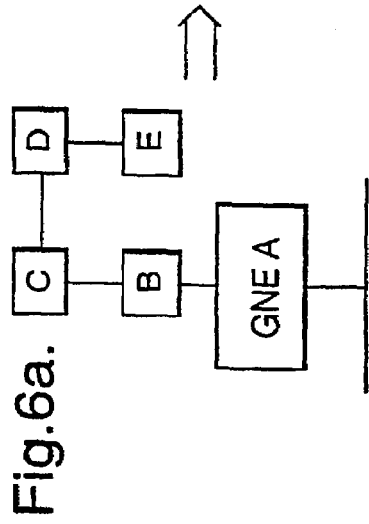

A "bus" type of topology such as that illustrated in FIG. 6a will, according to the invention, be transformed into the configuration shown in FIG. 6b. Here a manual end-system adjacency to B, C, D and E is entered on the GNE A for the DCC connecting it to B. The "external domain" attribute is also set on the circuit associated with this DCC. NE B is reconfigured to act as a L2 IS, with a length-zero prefix associated with the circuit of the DCC connecting B to A, for which circuit the "external domain" attribute is set as well. No reconfiguration is needed on the other NEs.

Figure 7A:
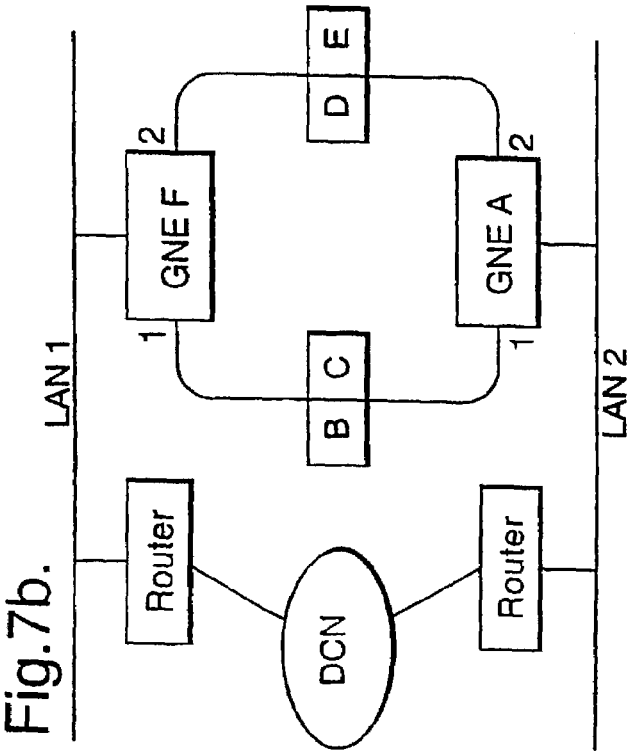
FIGS. 7 and 8 illustrate alternative embodiments of the invention in the case where multiple GNEs are involved.
Figure 7B:
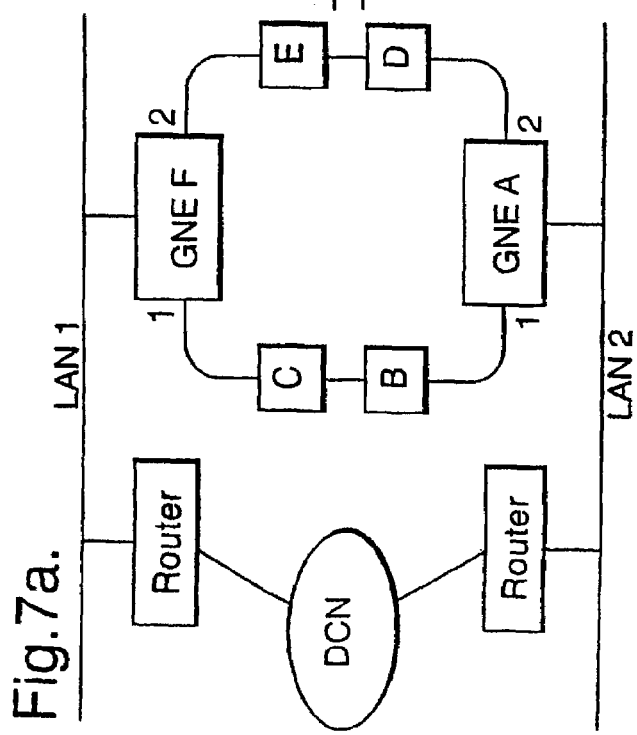

The invention may also be applied to a topology in which there are two GNEs, as illustrated in FIG. 7. In FIG. 7a GNEs A and F interface with respective LANs 1 and 2 and form a ring with ISs B, C, D and E. In this case, manual end-system adjacencies associated with the circuits using DCCs 1 of GNEs A and F have to be entered on such GNEs for NEs B and C. In the same way, manual end-system adjacencies associated with the circuits using DCCs 2 of GNEs A and F have to be entered on these GNEs for NEs D and E. Again, the appropriate "external domain" attributes are set and length-zero RAPs supplied on B, C, D and E, which are also designated to act as L2 ISs. (See FIG. 7b).

Note that manual adjacencies here are only created towards NEs which are reachable on a given DCC without crossing through another GNE. Thus in FIG. 7, no adjacency to NEs B and C is created in association with DCC 2 of GNE A, since these NEs are reachable on this DCC only by crossing through GNE F.

In this particular configuration the ring is susceptible to problems resulting from a single link or other failure on the ring. To compensate for this drawback it is possible to incorporate the principles embodied in the co-pending UK patent application GB 9805247.5 of priority date 31 Jul. 1997 and filed in the name of GPT Limited, the application being titled "M A Alternate Routeing".

Figure 8A:
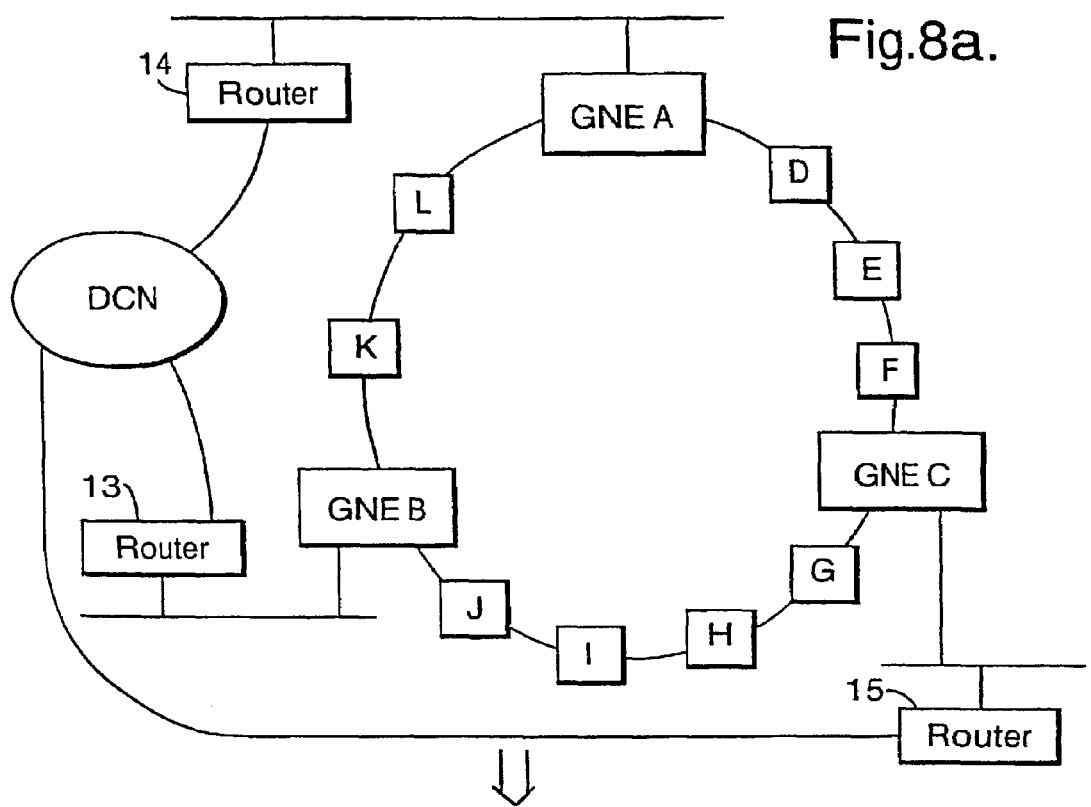
Figure 8B:
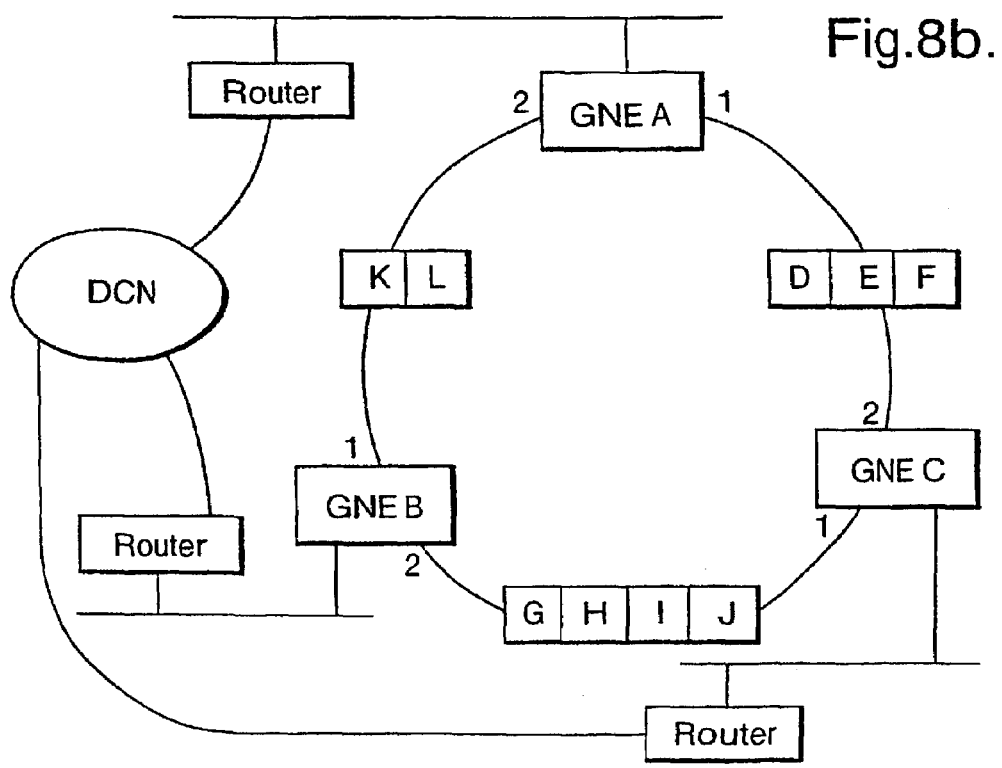

FIG. 8a shows a case in which three GNEs are present (A, B, C). It is assumed that these GNEs all fit in the same area that also contains routers 13, 14 and 15. The fact that the external routers all fit in the same area means that either the area is connected (that is, it is possible to go from any router to any other by following a DCN path only crossing through routers in the area), or it is partitioned, in which case, the external routers need to implement the partition repair feature of the IS-IS protocol. In this case the present invention reconfigures the topology to arrive at the scheme of FIG. 8b, in which manual adjacencies are set up as will now be described:

1. GNE A: one manual adjacency on DCC 1 to NEs D, E and, F, and one on DCC 2 for NEs K and L;

2. GNE B: one manual adjacency on DCC 1 to NEs K and L, and one on DCC 2 for NEs G, H, I and J;

3. GNE C: one manual adjacency on DCC 1 to NEs G, H, I and J, and one on DCC 2 to NEs D, E and F.

"External domain" flags are set in the DCCs of the GNEs and in the circuits of NEs D, F K, L, G and J which are connected to the GNEs, while the appropriate length-zero RAPs are set up in these circuits as well.

The extension of the FIG. 8 scheme to a number of GNEs more than three is easy to implement if the following condition is satisfied, namely that manual adjacencies are created on each GNEs only for the NEs comprised between it and the next closest GNEs on the same ring.

The constraint that the GNEs must be in the same area might seem restrictive at first glance, but this will often not be a problem in practice, since the number of acting ISs according to the invention will not be great, in view of the fact that most NEs will end up looking as ESs to the rest of the DCN. Hence quite a large area can be covered without the maximum number of ISs suggested by the IS-IS protocol being exceeded.

According to the embodiments described above which may be typified as concerning a "static routeing solution", it is necessary to configure a number of static routes on the Gateway Network Element. This may become a significant overhead for the operator, especially if the DCN topology is subject to significant changes. The "static routeing solution" is not so well suited to topologies in which multiple Gateways are present. For such topologies, a failure of a link may cause a part of the DCN to become unreachable even if physical routes to it still exist. The "static routeing solution" is also not so well suited to topologies in which a part of the DCN is accessible through more than two circuits configured on the same Gateway. The problem is, again, one of fault tolerance.

The above problems are addressed by introducing a proprietary extension to the network architecture described by the IS-IS protocol recommendation according to a further preferred embodiment of the present invention. Such extension needs to be implemented on all the Network Elements that are adjacent to (i.e. directly connected to) a Gateway Network Element. No change is needed on the rest of the transmission equipment (that is, either on the Gateway Network Elements or in the non-Gateway Network Elements that are not directly connected to one of the Gateways).

The solution according to this further preferred embodiment is based on the definition of "peripheral domains". A peripheral domain is defined as a part of the DCN as follows:

1. A collection of systems (i.e. End and/or Intermediate Systems) arranged within a DCN such that there is no System (either End or Intermediate System) in the DCN, external to the collection, which has to pass through at least one system internal to the collection to reach another system external to the collection. In other words, the peripheral domain appears to the rest of the DCN as an End System appears to an Intermediate System: it may originate and receive packets, but not route them.

2. If there is more than one circuit connecting the collection of systems to the rest of the DCN, each of these circuits provides access from the systems of the collection to all the systems in the rest of the DCN, possibly by means of routes with different costs. In fact, this is implicit in 1, above.

3. All the systems in the collection fit in a single IS-IS area and all the systems outside the collection, which are directly connected via the DCN to a system within the collection also fit in the same IS-IS area as the systems in the collection. Note that this is just an administrative requirement, and that the Network Addressing Plan may generally be arranged to comply with it.

Figure 9:
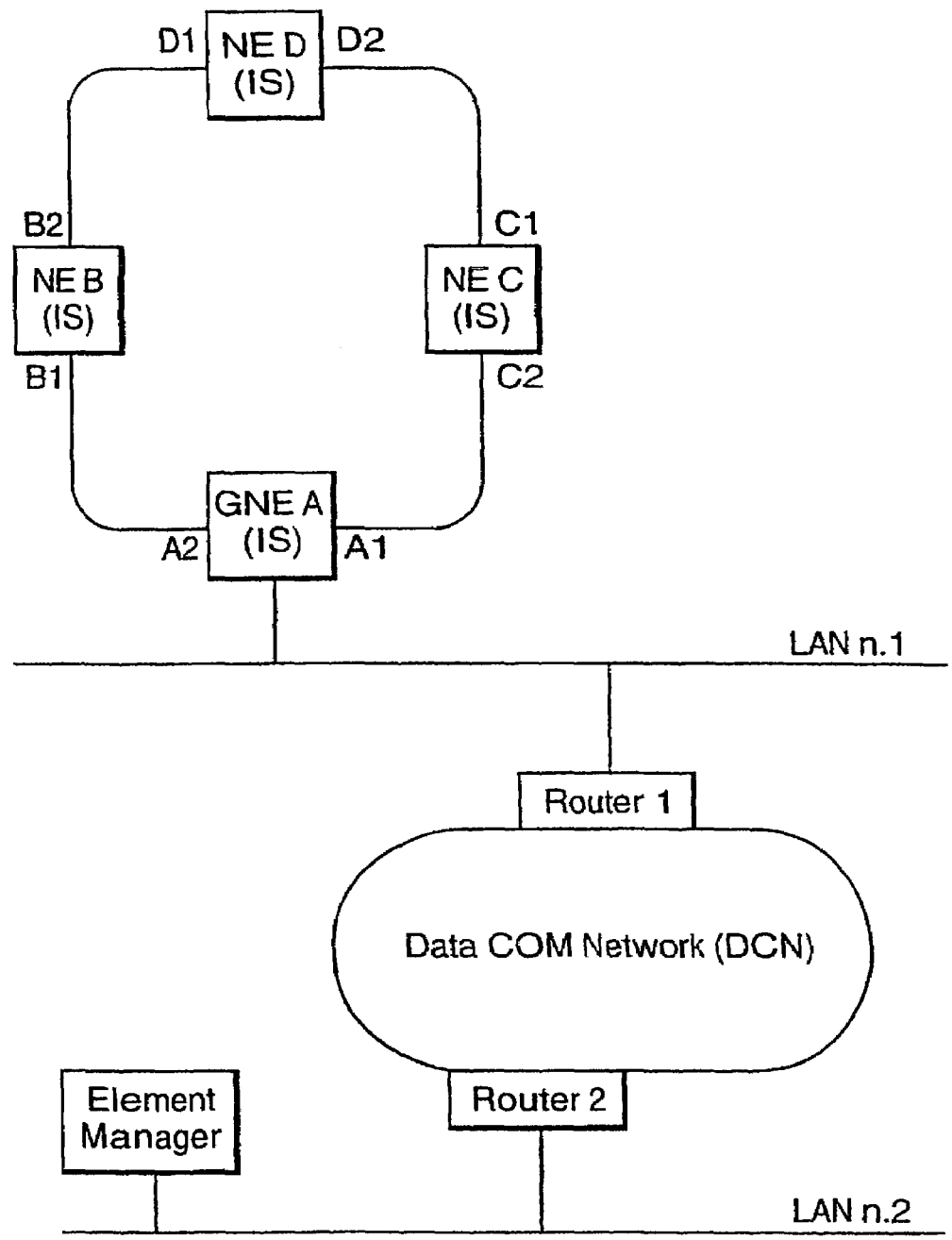
FIG. 9 illustrates an SDH-DCN ring arrangement.

An example of a peripheral domain in the context of an SDH ring will now be described with reference to FIGS. 9 and 10. In FIG. 9, systems B, C and D may be regarded as a peripheral domain and the DCC channels B1-A2 between GNE A and NE B and A1-C2 between GNE A and NE C as the peripheral domain boundaries.

The IS-IS recommendation provides the possibility of limiting the size of a given domain by defining domain boundaries. This is accomplished by setting (via a management operation) the External Domain attribute on the circuits associated with such boundaries.

In the same way, we define here the following extension to the Information Model used by the protocol (by "Information Model", we mean the set of objects with which the protocol deals, their attributes and allowed operations). Such extension is made up of a new attribute that may be set on a circuit of a level 2 Intermediate System (IS). This attribute is set only on to the circuits connecting the peripheral domain to the gateway network element(s). For example, in FIG. 9, the attribute is set on circuit B1 of system B and on circuit C2 of system C, but not on circuits A1 and A2 of system A). There is no need to set the attribute on circuits that are not boundaries of the peripheral domain. The peripheral domain attribute of a circuit is defined as follows.

If, for a level 2 IS, S, the attribute is set for a given circuit, S1, then S shall perform the following actions on incoming and outgoing routeing packets for S1 (data packets shall be handled as usual).

Regarding the processing of routeing traffic incoming from S1, the system S shall discard IS-IS Hello protocol data unit (IIH) packets and Sequence Number Protocol data unit (SNP) packets. It shall only process IS Hello protocol data unit (ISH) packets. If any ISH packets are received, and as long as the last received ISH is still valid (i.e. the holding time of the last ISH packet has not expired), system S shall automatically maintain a length-zero RAP (Reachable Address Prefix) for S1, and advertise it in its level 2 LSP.

As far as the routeing packets to be sent onto S1, the following actions shall be performed.

(1) Whenever the Dijkstra algorithm (this is the algorithm used by most routing protocols, including IS-IS, to calculate the shortest path to any reachable destination) is executed on S, the system shall generate as many End System Hello protocol data unit (ESH) packets as are needed to contain the addresses of all the systems it is able to see (i.e. it is aware of, by virtue of the IS-IS routeing protocol handling software, as described in recommendation ISO 10589) within the peripheral domain. Note that multiple End System to Intermediate System adjacencies may be created over a single circuit. By doing so, the system S shall display to the rest of the DCN outside of the peripheral domain all the systems within the peripheral domain as if they were End Systems reachable on the circuit (S1) associated with the peripheral domain boundary.

Note that the peripheral domain topology perceived by the rest of the DCN, and also by the Network Elements within the peripheral domain not directly connected to the gateway, is the same as in the "static routeing solution". According to this preferred embodiment, the ESH packets are generated according to the following rules.

1. As long as there is no change in the peripheral domain topology, the set of ESH packet is sent over each peripheral domain boundary with same average frequency as the average frequency of generation of a new LSP (Link State Protocol data unit) within the Peripheral Domain. As LSPs are originated by an Intermediate System with an average frequency of 15 minutes, the ESH packets set shall be sent over each domain boundary with a generation frequency of N/900 seconds, where N is the number of systems within the Peripheral Domain.

2. Whenever a change of the peripheral domain topology takes place, as soon as a system on the peripheral domain boundaries becomes aware of such change, it sends a complete updated set of ESH packets over the peripheral domain boundaries. As far as systems not reachable any longer are concerned, ESH packets containing their NSAPs are sent over the boundary with a holding time of 1 second, so that they are quickly deleted from the adjacency list of the gateway.

Figure 10:
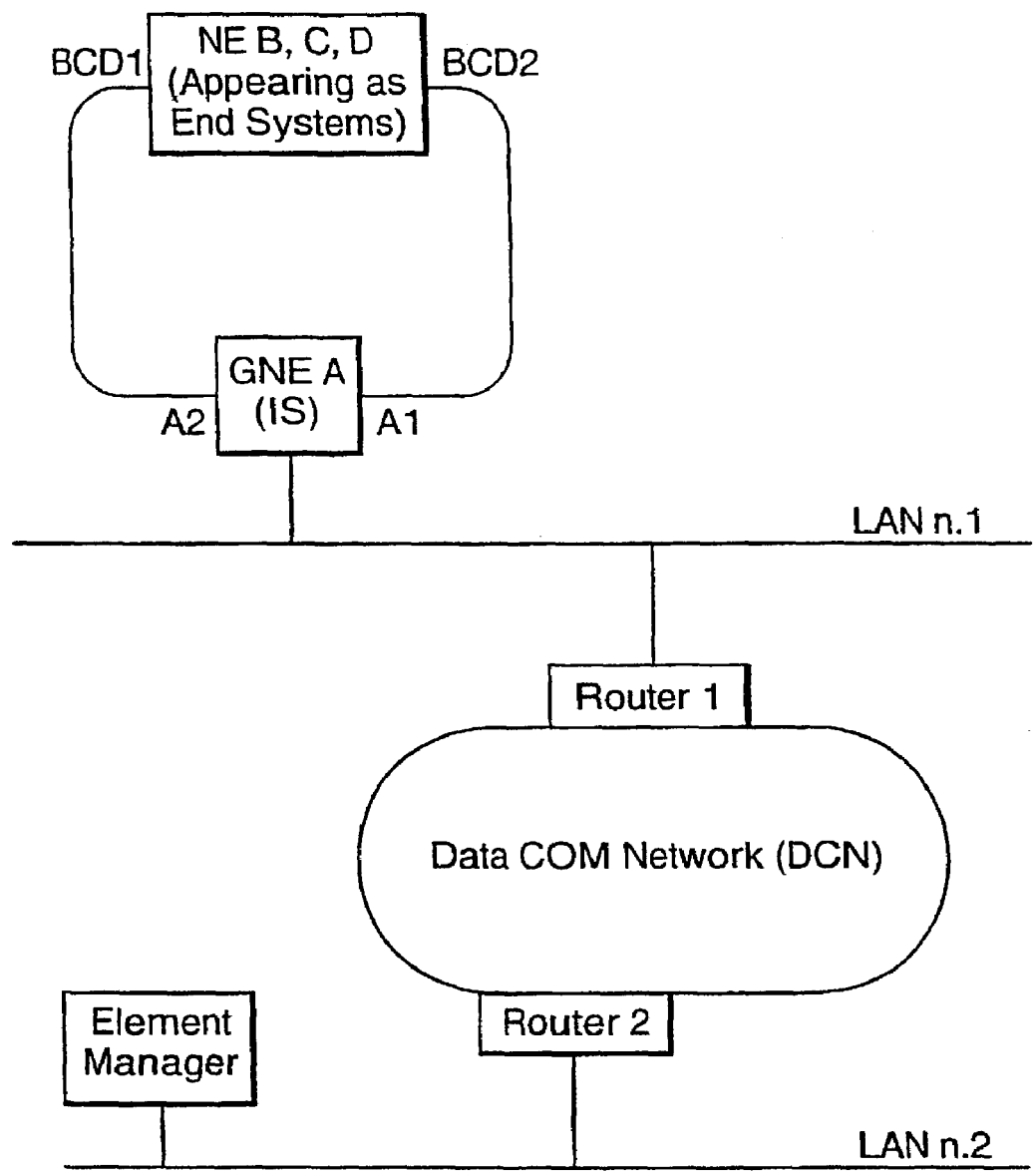
FIG. 10 illustrates how the ring of FIG. 9 appears to the rest of the DCN, after NEs of that ring has been reconfigured to provide a peripheral domain according to a further embodiment of the invention.

Referring to the example shown in FIG. 9, both the Gateway Network Element A and the rest of the DCN outside of the peripheral domain would be presented with the topology shown in FIG. 10. This is exactly the same topology that would be displayed by the Gateway to the rest of the DCN, if the static routeing configuration described above were adopted.

Advantageously, according to this further preferred embodiment, the DCN "virtual topology", as shown in FIG. 10, is not entered manually by the operator, but dynamically acquired from the network itself. This gives substantially the same advantages of the "static routeing" solution described above. In fact, some additional overhead is introduced to generate the ESH packets in the systems adjacent to the Gateway and to process them on the Gateway, but this represents much less traffic overall taking account of the reduction in the IIH and LSP processing and traffic overhead.

In addition the peripheral domain solution brings the following advantages:

1. It is not necessary to configure static routes on the Gateway to describe the DCN topology behind it. This greatly simplifies the DCN management.

2. As the information provided to the Gateway is acquired dynamically, any change in the peripheral domain topology is automatically recovered. This allows for recovery from any DCN failure in the peripheral domain that leaves a physical path to all the systems available. In particular, topologies in which the peripheral domain is accessible from the rest of the DCN outside of the peripheral domain through more than one Gateway are catered for.

Figure 11:
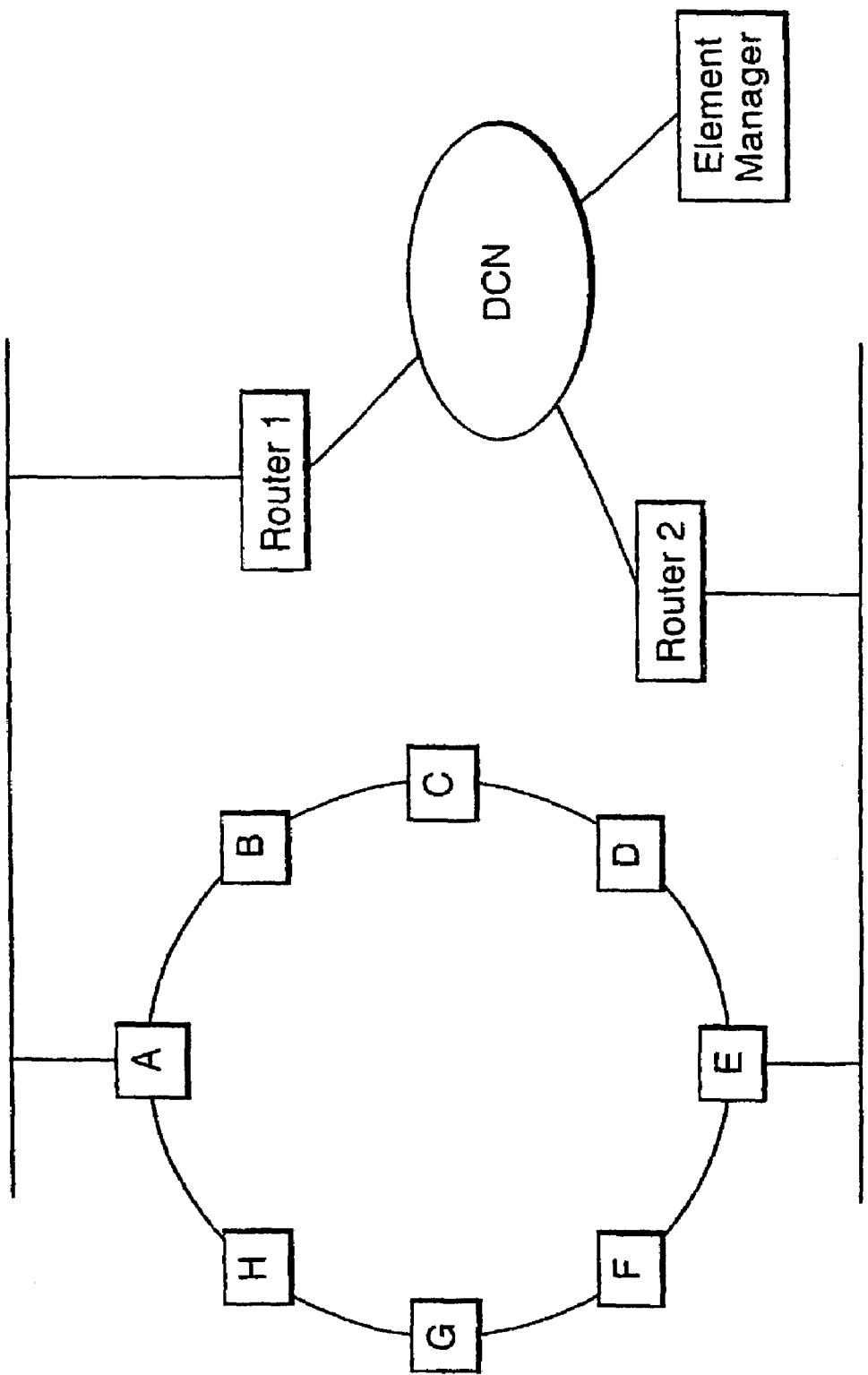
FIG. 11 illustrates a ring with eight Network Elements two of which are Gateways.
Figure 12:
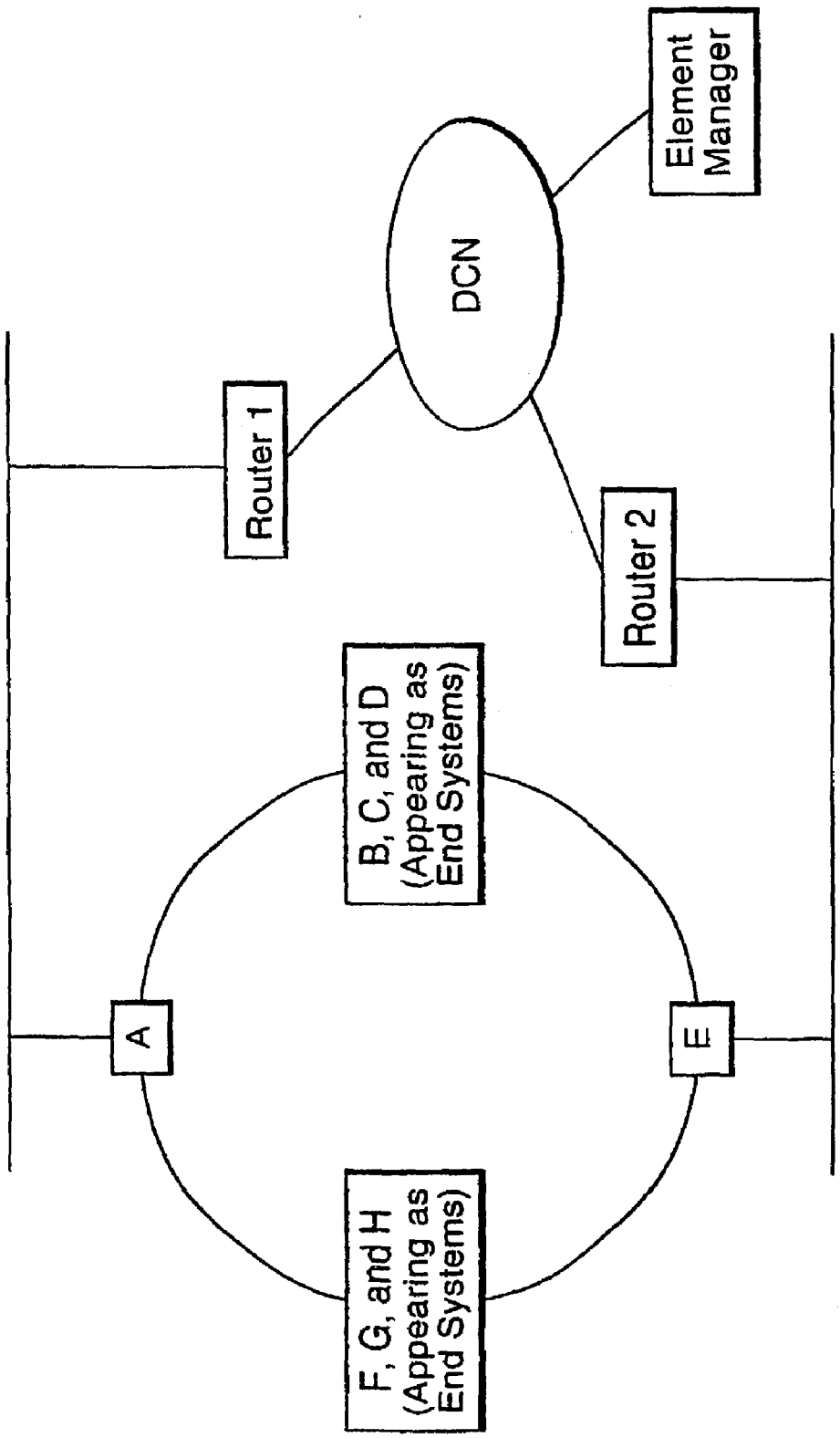
FIG. 12 illustrates how the ring of FIG. 11 appears to the rest of the DCN after two peripheral domains have been created.
Figure 13:
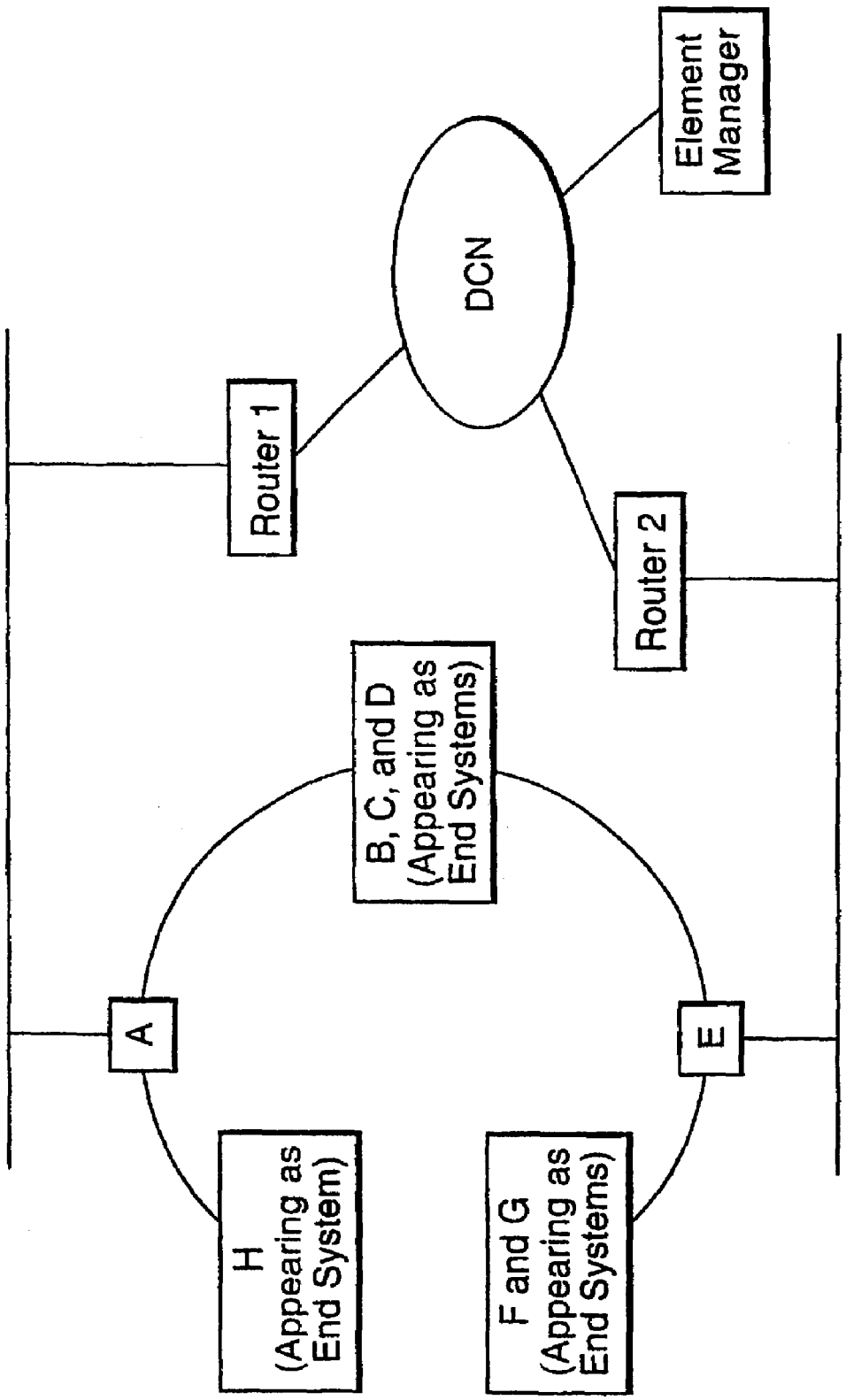
FIG. 13 shows how the topology illustrated in FIG. 12 changes when the link between NEs F and G fails.

This is illustrated in FIGS. 11 to 13. FIG. 11 describes a ring with eight Network Elements A to H and two Gateways A and E.

FIG. 12 shows how the ring topology appears to Gateways A and E, and to the rest of the DCN outside of the peripheral domain, after two peripheral domains have been created, one including Network Elements B, C and D, and the other one including Network Elements F, G and H.

FIG. 13 shows how the topology of FIG. 12 changes when the link between F and G fails. This change of topology is advertised outside the peripheral domain by new ESH packets that are produced by F and H on detection of the link failure within "their" peripheral domain. Note that the rest of the DCN is informed just of what it really needs to know, that is, it is told which DCC may be used to reach which systems.

The above attribute change would preferably be implemented in the Q-interface of transmission equipment (such as SDH Network Elements). Such interface is described in ITU-T Recommendation Q.811 "Series Q: Switching And Signalling—Specifications of Signalling System No. 7-Q3 interface" dated June 1997. The present invention improves the performance of the DCN (Data Communication Network), that is the infrastructure for the transmission equipment TMN (Telecommunication Management Network). The enhancement allows a number of Network Elements to be viewed by the rest of the DCN as if they were End Systems, even if they still have to provide routing functionality. At the same time, dynamic routing is still provided within the DCN core.

Finally, although the invention has so far been described with reference to the SDH system, it is also applicable to other communication systems which use the standard IS-IS routeing protocol.

While reference designators have been incorporated into the claims in order to facilitate the understanding thereof, these are not to be construed as being in any way limiting to the scope of the claims.

The invention claimed is:

1. A communications arrangement comprising: one or more Local Area Networks (LANs); one or more gateway network elements connected to each LAN; and one or more further network elements which, together with the one or more gateway network elements, form at least a part of a routing area, the one or more gateway network elements providing access to its respective LAN and acting as an interface between the one or more further network elements and the one or more LANs, wherein the one or more further network elements each comprise an intermediate system (IS) according to IS-IS protocol, and the one or more gateway network elements and the one or more further network elements are configured to make the one or more further network elements appear as end systems as far as the rest of the communications arrangement is concerned, each further network element appearing to each other further network element as an IS within the routing area, the end systems being made known to the rest of the communications arrangement by link state protocol packets generated by the one or more gateway network elements.

2. The communications arrangement according to claim 1, in which at least one of the one or more gateway network elements has one or more digital communication channels (DCCs) connected to respective ones of said further network elements, each of the one or more DCCs being provided with manual end-system adjacencies for at least some of the further network elements, and wherein each of the one or more DCCs has its "external domain" attribute flag set TRUE.

3. The communications arrangement according to claim 2, in which those further network elements which are directly connected to the or one of the gateway network elements by a DCC are configured as a Level 2 intermediate system and have their "external domain" attribute flag set TRUE for the circuit using said DCC, and in which said DCC is supplied with a length-zero reachable address prefix.

4. The communications arrangement according to claim 3, in which the gateway network element has two DCCs each of which gives access to one of the further network elements on a corresponding DCC thereof, the further network elements being connected in a chain configuration so as to form a ring with the gateway network element.

5. The communications arrangement according to claim 3, in which the gateway network element is connected to the further network elements by only one DCC.

6. The communications arrangement according to claim 5, in which there is set up on said one gateway DCC a manual end-system adjacency for all the further network elements, the "external domain" attribute flag is set TRUE for that one DCC and for the corresponding DCC of the one of the further network elements which terminates the DCC at the other end thereof, and a length-zero prefix is set up on the corresponding DCC of the terminating further network element, said terminating further network element being configured as a Level 2 intermediate system.

7. The communications arrangement according to claim 2, comprising a single gateway network element having one or two channels provided with manual end-system adjacencies for all of the further network elements.

8. The communications arrangement according to claim 2, in which there are two of the gateway network elements connected to respective ones of said one or more LANs, and in which a plurality of the one or more further network elements is connected between the two gateway network elements.

9. The communications arrangement according to claim 8, in which each of the gateway network elements and the further network elements has two DCCs, a first DCC of one gateway network element being connected to a DCC of a first one of the further network elements, a second DCC of the same gateway network element being connected to a DCC of a second one of the further network elements, a first DCC of the other gateway network element being connected to a DCC of a third one of the further network elements, and a second DCC of the other gateway network element being connected to a DCC of a fourth one of the further network elements.

10. The communications arrangement according to claim 9, in which each DCC of those further network elements which are directly connected to at least one of the gateway network elements has its "external domain" attribute flag set TRUE for a circuit using said DCC and has a reachable address prefix of length zero on the circuit connecting it to the gateway network element, and in which the first DCC of each gateway network element is set with manual end-system adjacencies for the first and second of the further network elements, and in which the second DCC of each gateway network element is set with manual end-system adjacencies for the third and fourth of the further network elements.

11. The communications arrangement according to claim 2, in which the or each gateway network element comprises a static route record in which has been manually entered one or more ranges of consecutive system identifiers corresponding to the manual end-system adjacencies.

12. The communications arrangement according to claim 2, in which a change on an intermediate system forwarding process is implemented such that, if there are two, equal-cost manual adjacencies matching a destination address of a given packet and one of these is associated with a circuit on which the packet was received, then the packet is forwarded onto another circuit.

13. The communications arrangement according to claim 1, in which a message packet, which is generated or forwarded in the part of the routing area by one the further network elements and is destined for a network element outside said part of the routing area but in the same area as the further network elements, is not discarded by a Level 1 intermediate system handling the message packet if said intermediate system has access to an attached Level 2 intermediate system forming part of the routing area.

14. The communications arrangement according to claim 1, in which a message packet, which is generated in the routing area or the part of the routing area defined by the gateway network element and further network elements and is destined for a network element outside the routing area or the part of the routing area, is not discarded by a Level 1 intermediate system handling the message packet if said intermediate system has access to a Level 2 intermediate system forming part of the routing area or the part of the routing area.

15. The communications arrangement according to claim 1, in which the one or more further network elements comprise a peripheral domain.

16. The communications arrangement according to claim 1, comprising a plurality of nodes including a first set consisting of the further elements and a second set excluding the further network elements, in which the second set comprises end systems (ES) and/or intermediate systems (IS), in which each node in the second set has a connection to every other node in the second set, and in which the connections only pass through nodes of the second set.

17. The communications arrangement according to claim 16, in which all the further network elements lie in a single IS-IS area, and in which all the nodes of the second set which are directly connected to the one or more of the further network elements lie in the IS-IS area.

18. The communications arrangement according to claim 16, in which the further network elements are connected to the nodes of the second set by more than one circuit; and in which each of the circuits provides access from at least some of the further network elements to all of the nodes of the second set.

19. The communications arrangement according to claim 16, in which each further network element directly connected to a node of the second set comprises means for discarding IS-IS hello protocol data unit (IIH) packets and sequence number protocol data unit (SNP) packets received from a node of the second set.

20. The communications arrangement according to claim 19, in which each further network element directly connected to a node of the second set is configured as Level 2 IS and comprises means for monitoring a receipt of IS hello protocol data units (ISH) packets and for maintaining a length-zero reachable address prefix (RAP) for the circuit from the further network element to the node of the second set while the last received ISH packet is still valid.

21. The communications arrangement according to claim 20, in which each further network element comprises a network address, and in which each further network element directly connected to a node of the second set comprises means for generating end system hello protocol data unit (ESH) packets containing the addresses of all the further network elements of which it is aware.

22. The communications arrangement according to claim 21, in which each further network element directly connected to a node of the second set comprises means for detecting a change in a topology of a part of the communications arrangement made up of the further network elements and their interconnection, and means for sending, when no change is detected, the ESH packets to the nodes of the second set with a frequency the same as an average generation frequency of LSPs by the first set of further systems.

23. The communications arrangement according to claim 22, in which each further network element directly connected to a node of the second set comprises means for sending the ESH packets to the nodes of the second set as soon as a change is detected.

24. The communications arrangement according to claim 23, in which the further network elements directly connected to a node of the second set comprise synchronous digital hierarchy (SDH) transmission equipment, in which the SDH transmission equipment comprises a Q-interface.

25. The communications arrangement according to claim 24, in which a message packet, which is generated or processed by one of the further network elements and is destined for a node of the second set that belongs to the routing area the same as the further network element, is not discarded by a Level 1 intermediate system handling the message packet if said intermediate system has access to an attached Level 2 intermediate system in the first set.

26. The communications arrangement according to claim 25, in which the communications arrangement forms a part of an SDH communications system.

* * * * *